April 6, 1965     F. O. LUENBERGER     3,176,532
GEAR TRANSMISSION MECHANISM
Filed April 27, 1962     3 Sheets-Sheet 1

INVENTOR.
FREDERICK O. LUENBERGER
BY
Flam and Flam
ATTORNEYS.

April 6, 1965   F. O. LUENBERGER   3,176,532
GEAR TRANSMISSION MECHANISM
Filed April 27, 1962   3 Sheets-Sheet 3

INVENTOR.
FREDERICK O. LUENBERGER
BY
Flam and Flam
ATTORNEYS.

United States Patent Office 3,176,532
Patented Apr. 6, 1965

3,176,532
GEAR TRANSMISSION MECHANISM
Frederick O. Luenberger, Los Angeles, Calif., assignor, by mesne assignments, to Emerson Electric Co., a corporation of Missouri
Filed Apr. 27, 1962, Ser. No. 190,539
2 Claims. (Cl. 74—410)

This invention relates to gearing, and particularly to reduction gearing adapted to be coupled to a source of motion, such as an electric motor.

It has been heretofore proposed, for the purpose of minimizing the size of components, to drive the final gear of a transmission by a pair of pinions engaging the teeth of the final gear at angularly spaced positions. Proper operation depends upon the load being equally shared by the pinions. To ensure equal sharing of the load, a pair of helical driving gears are provided that are mounted on a common sleeve in turn splined to the input shaft. The driving gears respectively connect, such as through suitable reduction gearing, to the pinions. The driving gears are of opposite and equal pitch so that any unbalance in distribution of load causes the gears to shift axially to rebalance the load by changing the phase of the respective gear sections.

The primary object of this invention is to provide a simple arrangement for adding a further stage of gear reduction in gear mechanism of this character.

Another object of this invention is to provide structure for facilitating the assembly of such mechanism.

This invention possesses many other advantages, and has other objects which may be made more clearly apparent from a consideration of one embodiment of the invention. For this purpose, there is shown a form in the drawings accompanying and forming a part of the present specification, and which drawings unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIG. 7 is a detail view, partly in section, illustrating the manner in which the lubricator pump is driven; and FIG. 8 is a sectional view taken along a plane corresponding to line 8—8 of FIG. 7.

Figure 1:
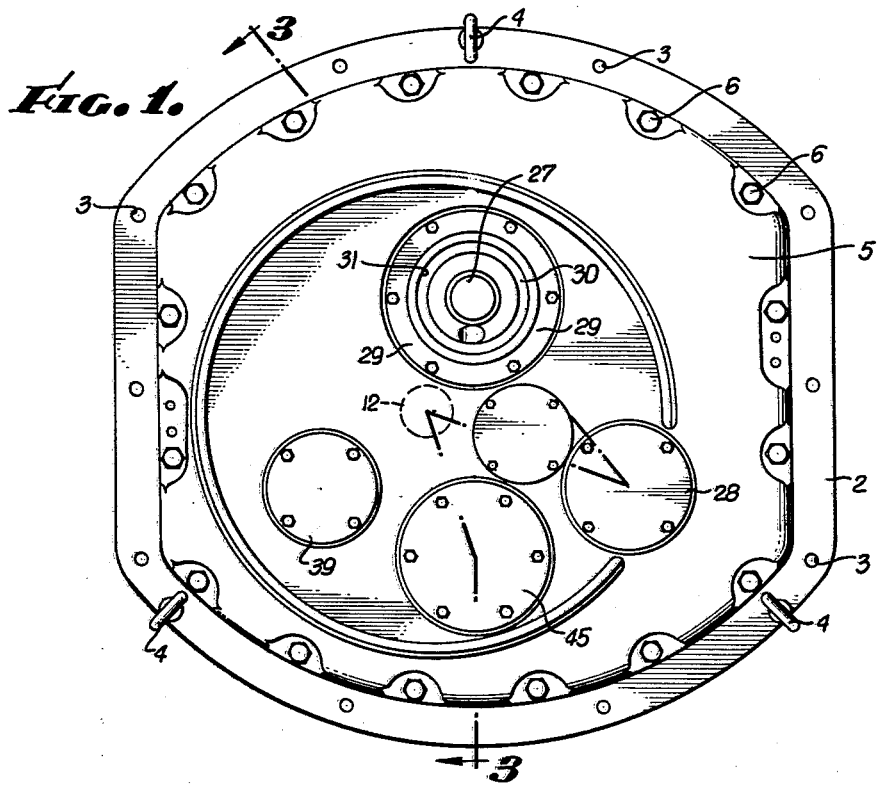
FIGURE 1 is a plan view of a gear transmission mechanism incorporating the invention.
Figure 2:
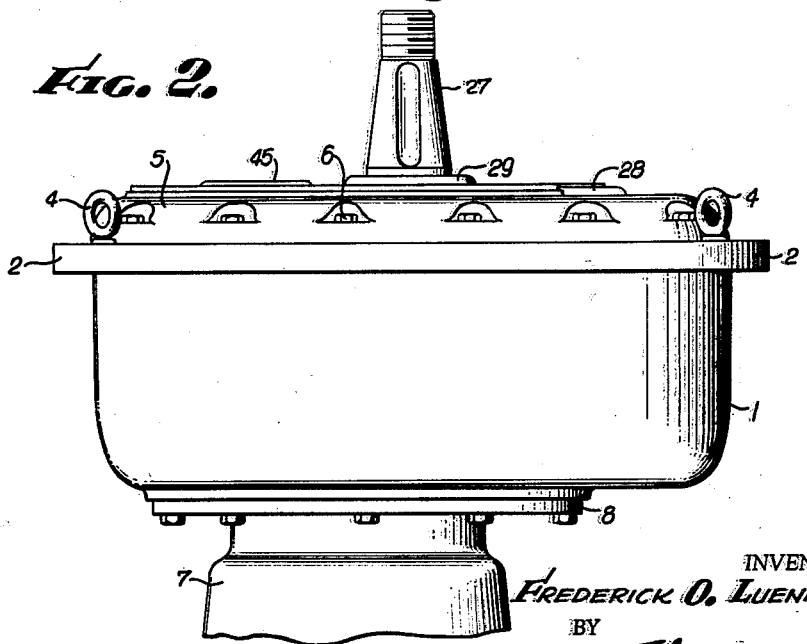
FIG. 2 is a side view thereof.

A casing 1 is provided in which all of the gear elements are accommodated. This casing 1 has a flange 2 provided with a plurality of apertures 3. Any of these apertures may accommodate an eye bolt 4. A number of such eye bolts may be used to facilitate hoisting of the mechanism.

A cover 5 (FIG. 3) is shown as bolted to the flange 2 as by hexagon head machine screws 6. An electric motor 7 has a frame which has a relatively wide flange 8 attached to the edge of the relatively large aperture 9 of the casing 1. This flange 8 together with the bottom portion of the casing 1 forms a well for the accommodation of the body of lubricant 10.

The motor shaft 11 carries a driving pinion 12. This driving pinion, which is preferably provided with helical teeth, engages a gear wheel 13. This gear wheel 13 is mounted or keyed on shaft 14. This shaft 14 carries two axially spaced pinions 15 and 16, both of them keyed to the shaft 14.

Figure 3:
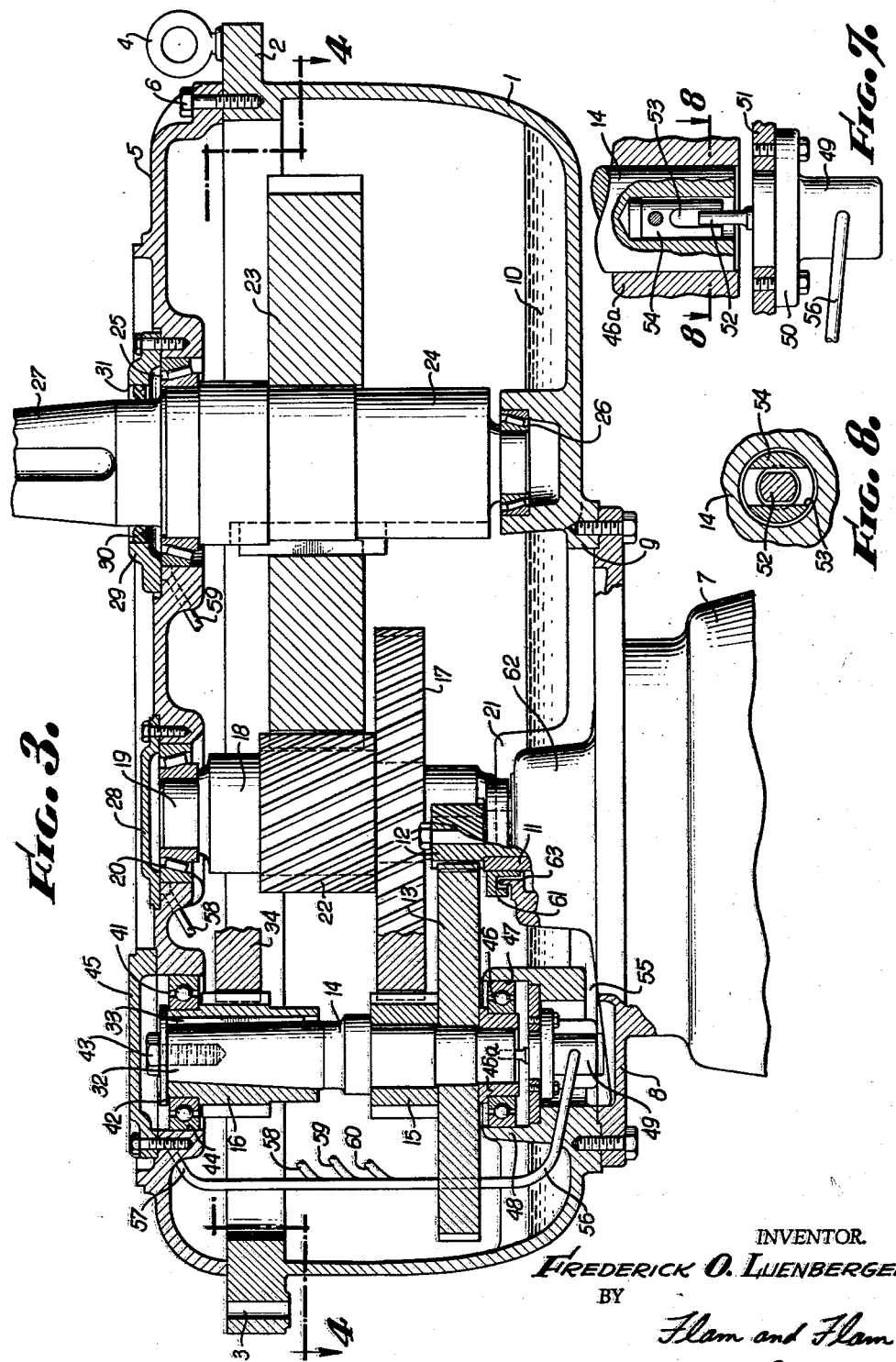
FIG. 3 is a sectional view, partly diagrammatic, taken along a plane corresponding to line 3—3 of FIG. 1.

Pinion 15 is directly adjacent to and above the gear wheel 13, and is likewise attached to shaft 14. It is provided with helical teeth and engages a gear wheel 17. This gear wheel 17 is mounted on a shaft 18. This shaft 18 has a reduced portion 19 (FIG. 3). This reduced portion is supported in the cover 5 by a conical roller bearing structure 20, the outer race of which is fixedly mounted in the cover 5.

A similar bearing structure is provided for the lower end of the shaft in the boss 21 (FIG. 3).

The shaft 18 has secured to it a pinion 22 also formed with helical teeth and engaging a final gear 23. This final gear is mounted on a shaft 24 supported at its upper end by bearing structure 25, similar to bearing structure 20, and at its lower end by a lower bearing structure 26, also similar to the structure 20.

The shaft 24 has a tapered extension 27 to which may be keyed any appropriate load.

Thus, the train of transmission from motor pinion 12 to the final gear 24 includes pinion 12, gear 13, pinion 15, gear 17, pinion 22 and gear 23.

Figure 6:
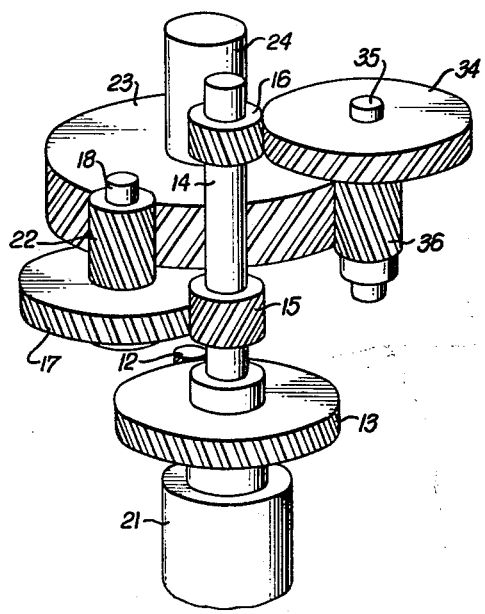
FIG. 6 is a pictorial view, mainly diagrammatic, illustrating the various gear elements utilized in the mechanism.

As illustrated most clearly in the diagrammatic view of FIG. 6, all of the teeth in these gears and pinions are helical.

A supplemental cap or cover 28 is disposed over the extension 19 of the shaft 18. A similar cap 29 is also provided above the upper end of the shaft 24. A rubber oil seal ring 30 is disposed around the upper part of the shaft 24, where it emerges through the cap 29. This ring 30 is attached in the aperture 31 formed in the cap 29.

Figure 4:
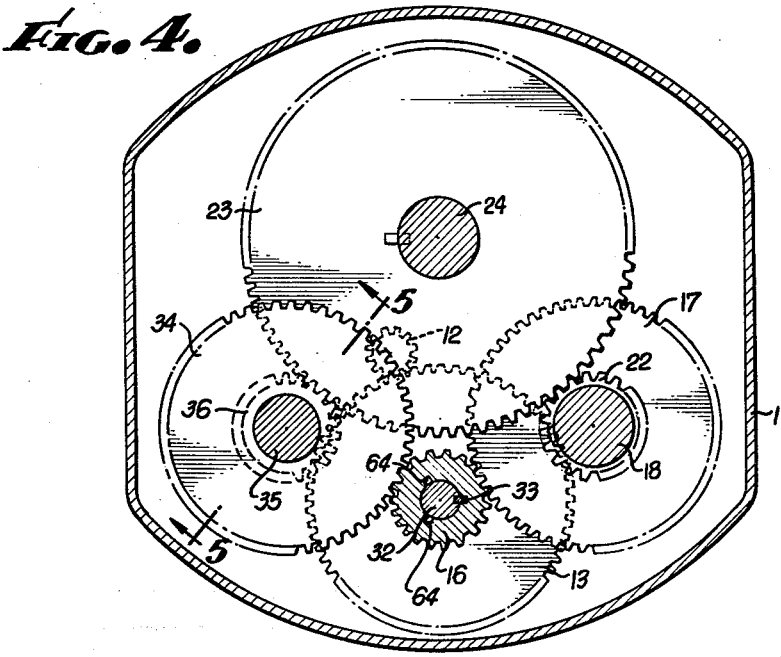
FIG. 4 is a sectional view, partly diagrammatic, taken along a plane corresponding to line 4—4 of FIG. 3.

The pinion 16, formed with helical teeth, is secured to the upper tapered portion 32 of the shaft 14 and is also keyed thereto by the aid of the key 33 (FIG. 4). This pinion meshes with a gear 34 (FIG. 5).

Figure 5:
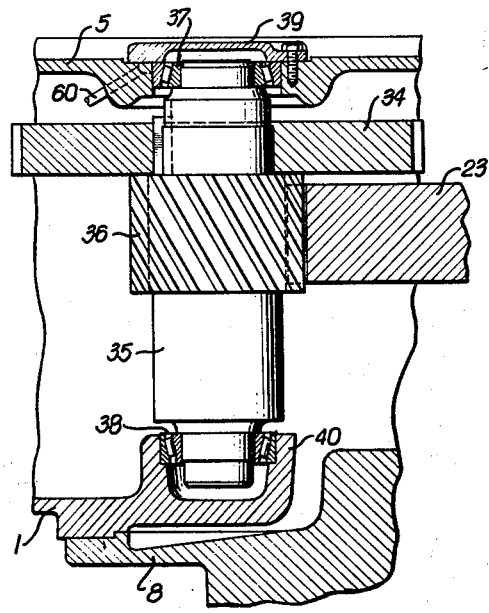
FIG. 5 is a sectional view, taken along a plane corresponding to line 5—5 of FIG. 4.

As shown most clearly in FIG. 5, the gear 34 is mounted on a shaft 35 to which it is keyed. The shaft 35 also carries a helical pinion 36 which engages the final gear 23. The axes of pinions 22 and 36 are angularly spaced with respect to the axis of the output shaft 24.

Thus, there are two parallel drives to the output or final gear 23. The first one has been heretofore traced. The second one includes motor pinion 12, gear 13, pinion 16, gear 34, pinion 36 and final gear 23.

The shaft 35 is appropriately supported by roller bearing structures 37 and 38. A supplemental cover or cap 39 is disposed over the upper end of the shaft 35. The roller bearing structure 38 is appropriately mounted in a boss 40 formed in the bottom of the casing 1.

The shaft 14 is purposely made floating so that it may move axially either upward or downward, as viewed in FIG. 3.

For this purpose, a ball bearing structure 41 is mounted on a reduced upper portion of pinion 16. The inner race is held on shaft 14 by the aid of a disc 42 attached to the upper end of the shaft extension 32 by a machine screw 43, the race being urged against a shoulder on pinion 16.

The outer race of the bearing structure 41 is slidably mounted in an aperture 44 in the cover 5. A supplemental cover or cap 45 is mounted on the cover 5 and overlies the shaft extension 32.

At the lower end of the shaft 14 there is similarly mounted a ball bearing structure 46, attached to a sleeve 46a carried by shaft 14. The outer race of this ball bearing structure is slidable in an aperture 47 formed in the boss 48 integral with the casing 1.

The helically formed teeth on pinions 15 and 16 as viewed in FIG. 6 have oppositely directed helical angles. Accordingly, considering the source of power as pinion 12, the direction of the teeth on gear 13 is such that a thrust upwardly is exerted by pinion 12 on the gear 13. This thrust may produce an upward movement of the shaft 14 in an axial direction. The pinions 15 and 16 have oppositely angled helical teeth. The force exerted on pinion 15 by the load represented by gear 17 also produces an upward thrust; but the axial force acting on pinion 16 from the load represented by gear 34 is downward. By proper choice of helical angles of the three gears 13, 15 and 16, the resultant of these three thrusts can be substantially neutralized. Thus, the helical angle of pinion 16 must be large enough to take care of the combined thrust exerted on pinion 15 and gear 13. The helical angles of the pinions 15 and 16 are necessarily different. In this way it is assured that the load will be equal divided between pinions 15 and 16.

When assembling the key 33 with pinion 16 and shaft extension 32, the shaft 14 may have to be axially adjusted to secure proper meshing of the teeth on pinion 16 and gear 34. In order to keep this axial adjustment within tolerable limits a plurality of keyways 64 (FIG. 4), is provided, angularly spaced, such that the angle between keyways is not an exact multiple of the pitch of the teeth and, therefore, the angular distance between any keyway and the closest tooth is no greater than the tooth pitch divided by the number of keyways.

Therefore, when the key 33 is to be inserted in one of the keyways 64, that one is chosen which requires the least axial adjustment of shaft 14 to provide meshing of the teeth.

Provisions for lubricating all of the bearings are indicated diagrammatically in FIGS. 3 and 5. Thus, the level of the oil 10 while the transmission mechanism is not in operation is below the top levels of all of the lower bearing structures, such as 26, 46 and 38. A pump 49 is driven by the shaft 14 (FIG. 7). This pump has a supporting flange 50 mounted on the lower surface of a wall 51 fastened in the boss 48 below the shaft 14. The pump has a shaft 52 that is flattened at its upper extremity. This flattened portion is accommodated in a slot 53 formed in a cylindrical insert 54 mounted in the bottom of the shaft 14. Due to the looseness of the fit between the slot 53 and the shaft 52, any minor deviation from true coaxiality between the shaft 14 and the shaft 52 does not interfere with free rotation of the pump shaft 52.

There is an inlet 55 for the pump 49 which is in communication with the body of lubricant 10. An outlet conduit 56 is indicated diagrammatically in FIGS. 3 and 7. It has branches such as 57, 58, 59 and 60 leading to the spaces above the upper bearings 41, 29, 25 and 37.

The lubricant supplied to these upper bearings passes between the rolling elements of the bearings, down to the lower bearings, and is finally collected in the bottom of the casing 1. The bottom thus serves as a lubricant well.

A slinger ring 61 is mounted externally of the housing for motor 7, on the shaft 11, for preventing lubricant from entering the housing. This ring extends around the flange 63 carried by hollow boss 62. This boss forms a part of the motor housing.

The inventor claims:
1. In a reduction gear mechanism; a driven gear; a pair of pinions engaging the gear, the axes of the pinions being angularly spaced about the axis of the driven gear; a pair of intermediate driven gears rotatable with the pinions; a shaft; means mounting the shaft for at least limited axial movement; a pair of axially spaced pinions mounted on the shaft and engaging the intermediate driven gears respectively; another intermediate driven gear mounted on said shaft; the axially spaced pinions and the said other intermediate driven gear all having helical teeth, the helical angles of the two axially spaced pinions being of opposite hands and of different helical angles to produce an axial thrust on said shaft when the torques exerted by said axially spaced pinions are equal; the helical angle of said other intermediate driven gear being designed to balance said axial thrust; and an input pinion engaging said other intermediate driven gear.

2. The combination as set forth in claim 1 together with a key for rotatably connecting said shaft and one of said axially spaced pinions, said one of said axially spaced pinions having a plurality of keyways spaced equiangularly about the axis of the shaft, the angular spacing of the keyways being different from an exact multiple of the pitch of the teeth of said one pinion.

References Cited by the Examiner
UNITED STATES PATENTS

| | | | |
|---|---|---|---|
| 1,367,500 | 2/21 | Redmond et al. | |
| 2,143,921 | 1/39 | Lewis | 74—410 X |
| 2,370,002 | 2/45 | Brecht | 74—410 |
| 2,712,761 | 7/55 | Chung | 74—410 |
| 3,064,494 | 11/62 | Brewster. | |

FOREIGN PATENTS 814,905    6/59    Great Britain.

DON A. WAITE, *Primary Examiner.*

BROUGHTON G. DURHAM, *Examiner.*